(No Model.)
I. L. BALLARD & J. W. CRAIG.
RAILROAD GATE.
No. 285,951. Patented Oct. 2, 1883.
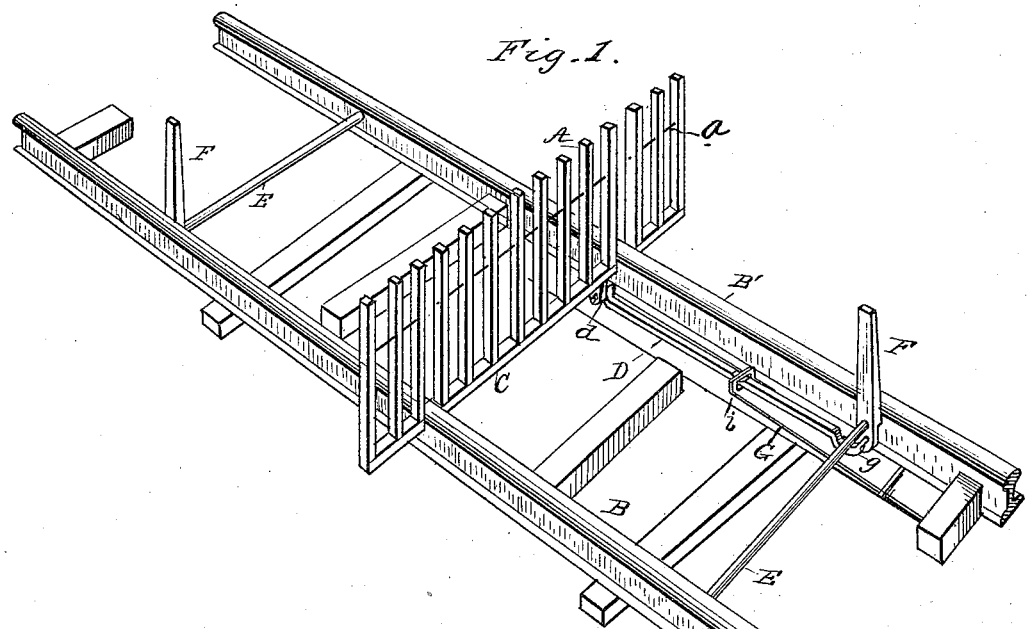
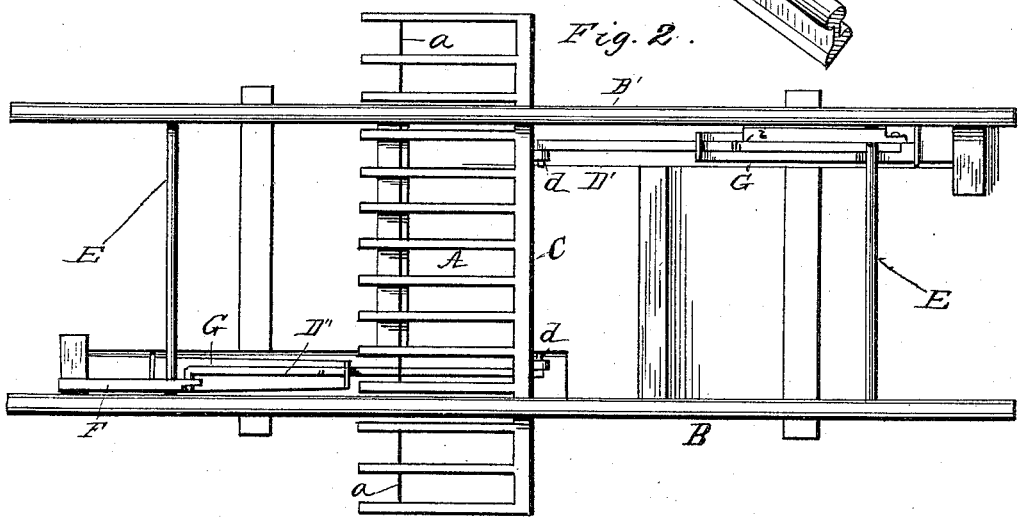

UNITED STATES PATENT OFFICE.

IRA L. BALLARD AND JOHN W. CRAIG, OF MECHUM'S RIVER, VIRGINIA.

RAILROAD-GATE.

SPECIFICATION forming part of Letters Patent No. 285,951, dated October 2, 1883.

Application filed March 14, 1883. (No model.)

*To all whom it may concern:*

Be it known that we, IRA L. BALLARD and JOHN W. CRAIG, of Mechum's River P. O., in the county of Albemarle and State of Virginia, have invented certain new and useful Improvements in Railroad-Gates; and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention is for an improvement upon that class of inventions known as "railroad-gates," and has for its object to provide a gate designed to stand vertically across the track, with suitable operating mechanism, whereby it is brought to a horizontal position by cars passing over the track and again restored to an erect or vertical position.

To this end it consists in the combination, in the gate and rails, of suitable shafts, crank and lever rods, so connected and operated by the use of suitable springs as to facilitate its ready and easy operation for the purpose intended, all of which will be more particularly hereinafter described.

Referring to the drawings, Figure 1 is a perspective view of a gate and portion of railroad-track embodying our improvements. Fig. 2 is a plan view of the same.

A indicates the gate, and B B' the railroad-track. The gate is preferably made of iron or other metal, and, as shown in the drawings, is made into what we will term in said figures "three sections." All of the sections are formed on the same base or sill C, said sill being made journal-like between the sections, and designed to work through or under the rails, which are the bearings, as shown. The bars of each section may be joined near the top by the connections $a$, or not, as desired; but, as shown, there is no connection at the top between the sections which allows of the gate to be thrown down horizontally and the rails upon which the cars travel to come up between. As shown, connecting-rods are employed for effecting the depression of the gate. These rods D' D'' are connected at one end to the under side of the gate-sill in bearing $d$, depending therefrom, and work through the end of a spring which is slightly bent and slotted. These connecting-rods at about the middle of their length are slightly recessed, as at $i$, so that when the gate is normally in position the edge of the spring rests therein and serves to steady the gate.

E represents cross-rods held between the track-rails at suitable distances to each side of the gate, and are rigid, the levers F working back and forth thereon, the shorter arms of said levers being pivotally joined to the connecting-rods, this end of the rods being bent or turned into a concave, $g$, so that when the gate is brought to a horizontal position it allows of the connecting-rods being raised sufficiently to lay the gate flat. Said connecting-rods are designed to be of length sufficient that the wheels of a truck will be in contact with one or the other of the levers F, to thus keep the gate down until the train has passed. The springs G are of strong steel, and the inner ends thereof bent upwardly and slotted for the working therein of the connecting-rods D, and are secured on a block of wood sufficiently long, and which is halved into the cross-ties of the rails, and are located along the inner side of the track on the reverse sides of the gate.

The operation of this construction will also be obvious. When a lever, F, is borne down by a train coming from either direction, the springs are raised, and when the train has passed the springs, of their resiliency, draw down the connecting-rods, thus raising the gate to a vertical position.

Having thus described our invention, what we claim is—

1. In a railroad-gate, the gate journaled in or beneath the rails, and the connecting-rods arranged therewith and connected to the crank-shafts, as described, in combination with the springs secured on a strip which is halved into the cross-ties, said springs adapted to operate the connecting-rods, substantially in the manner and for the purpose described.

2. In a railroad-gate, the combination of the gate and connecting-rods, as described, and the springs working beneath said rods, with the cross-rods and operating-levers, said cross-rods being rigid between the rails, and said levers fulcrumed thereon, having the shorter arm connected with the connecting-rods, substantially as set forth.

3. In a railroad-gate, the combination of the gate journaled in or beneath the rails, as described, with the connecting-rods connected at one of their ends to bearings depending from said gate, and working through slotted springs, said rods being concave at their other ends and connected to the shorter arm of upright levers which turn on rigid shafts extending between the rails, as described.

4. In a railroad-gate, the combination of the movable upright levers working on rigid shafts, as described, and connected to the concave end of the connecting-rods, said rods being connected to the gate in bearings and recessed at about the middle of their length, as described, with the slotted springs, said springs working on the rods and secured on strips in the ties of the rail, substantially as described.

In testimony that we claim the foregoing as our own we affix our signatures in presence of two witnesses.

IRA L. BALLARD.
JOHN W. CRAIG.

Witnesses:
J. FRANK FARROW,
WM. J. FARROW.